(12) United States Patent
Garre et al.

(10) Patent No.: US 10,571,354 B2
(45) Date of Patent: Feb. 25, 2020

(54) SYSTEM, TEST CHAMBER, AND METHOD FOR RESPONSE TIME MEASUREMENT OF A PRESSURE SENSOR

(71) Applicant: FREESCALE SEMICONDUCTOR, INC., Austin, TX (US)

(72) Inventors: Philippe Garre, Tempe, AZ (US); Silvia Garre, Scottsdale, AZ (US); William DeWitt McWhorter, Goodyear, AZ (US); Larry Dale Metzler, Phoenix, AZ (US)

(73) Assignee: NXP USA, Inc., Austin, TX (US)

( * ) Notice: Subject to any disclaimer, the term of this patent is extended or adjusted under 35 U.S.C. 154(b) by 471 days.

(21) Appl. No.: 15/246,097

(22) Filed: Aug. 24, 2016

(65) Prior Publication Data

US 2018/0058970 A1    Mar. 1, 2018

(51) Int. Cl.
*G01L 27/00* (2006.01)
*G01L 19/00* (2006.01)

(52) U.S. Cl.
CPC .......... *G01L 27/00* (2013.01); *G01L 19/0092* (2013.01)

(58) Field of Classification Search
CPC ............................. G01L 27/00; G01L 19/0092
See application file for complete search history.

(56) References Cited

U.S. PATENT DOCUMENTS

| | | |
|---|---|---|
| 4,777,716 A | 10/1988 | Folk et al. |
| 5,437,284 A * | 8/1995 | Trimble ................ A61B 5/031 |
| | | 600/486 |
| 7,492,668 B2 | 2/2009 | Chang et al. |
| 2007/0095146 A1 | 5/2007 | Brosh |
| 2008/0053188 A1 * | 3/2008 | Itoh ........................ B22D 17/26 |
| | | 73/1.15 |
| 2009/0084189 A1 * | 4/2009 | McMechan ................ G01N 3/12 |
| | | 73/803 |
| 2014/0076052 A1 | 3/2014 | Doller et al. |
| 2016/0265986 A1 * | 9/2016 | Ono ........................ G01L 9/0073 |

FOREIGN PATENT DOCUMENTS

| | | |
|---|---|---|
| JP | H04309831 A | 11/1992 |
| KR | 1020050030718 A | 3/2005 |

OTHER PUBLICATIONS

Chang, H. et al., "Hydraulic square pressure generator for dynamic calibration of pressure sensors at low frequencies", Sixth International Symposium on Precision Engineering Measurements and Instrumentation, vol. 7544, SPIE, Bellingham, WA, USA 7 pgs (Dec. 31, 2010).

* cited by examiner

*Primary Examiner* — Justin Seo
*Assistant Examiner* — John M Royston
(74) *Attorney, Agent, or Firm* — Charlene R. Jacobsen

(57) ABSTRACT

A test chamber is used within a system for testing microelectromechanical systems (MEMS) pressure sensors. The system includes a processor, two air tanks pressurized to different air pressures, a high speed switch mechanism, and the test chamber. The test chamber houses a MEMS pressure sensor to be tested, a control pressure sensor, and a temperature sensor. The MEMS pressure sensor and the control pressure sensor are located in a cavity within the test chamber. The cavity is of minimal size and has a domed inner surface. A response time of the MEMS pressure sensor within the cavity can be characterized by utilizing the system and subjecting the MEMS pressure sensor to a pressure stimulus pulse produced by switching between the two air tanks.

17 Claims, 9 Drawing Sheets

SYSTEM, TEST CHAMBER, AND METHOD FOR RESPONSE TIME MEASUREMENT OF A PRESSURE SENSOR

TECHNICAL FIELD OF THE INVENTION

The present invention relates generally to pressure sensors. More specifically, the present invention relates to testing a pressure sensor using a pressure stimulus pulse to measure the response time of the pressure sensor.

BACKGROUND OF THE INVENTION

Microelectromechanical systems (MEMS) pressure sensors are used for control and monitoring in a wide variety of industrial and consumer applications. Some pressure sensors are designed to capture very high speed changes in pressure. Emerging markets for such pressure sensors include, for example, side airbag automotive applications. In such a safety critical application, these pressure sensors need to be tested in order to verify proper functionality of the pressure sensors and to verify that their parameters fall within the design specification. More particularly, for pressure sensors that are designed to capture high speed changes in pressure, there is a need to measure the MEMS pressure sensor response time.

BRIEF DESCRIPTION OF THE DRAWINGS

The accompanying figures in which like reference numerals refer to identical or functionally similar elements throughout the separate views, the figures are not necessarily drawn to scale, and which together with the detailed description below are incorporated in and form part of the specification, serve to further illustrate various embodiments and to explain various principles and advantages all in accordance with the present invention.

DETAILED DESCRIPTION

In overview, embodiments disclosed herein entail a system, a test chamber used within the system, and a method of testing microelectromechanical systems (MEMS) pressure sensors using the system and test chamber. More particularly, various inventive concepts and principles embodied in the system and method enable response time measurement for pressure sensors that are designed to capture rapid changes in pressure, such as in side airbag automotive applications. Further, the system and method may be implemented in a laboratory configuration in the evaluation phase of pressure sensor development and/or in a production environment during final testing.

The instant disclosure is provided to further explain in an enabling fashion the best modes, at the time of the application, of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It should be understood that the use of relational terms, if any, such as first and second, top and bottom, and the like are used solely to distinguish one from another entity or action without necessarily requiring or implying any actual such relationship or order between such entities or actions.

Figure 1:
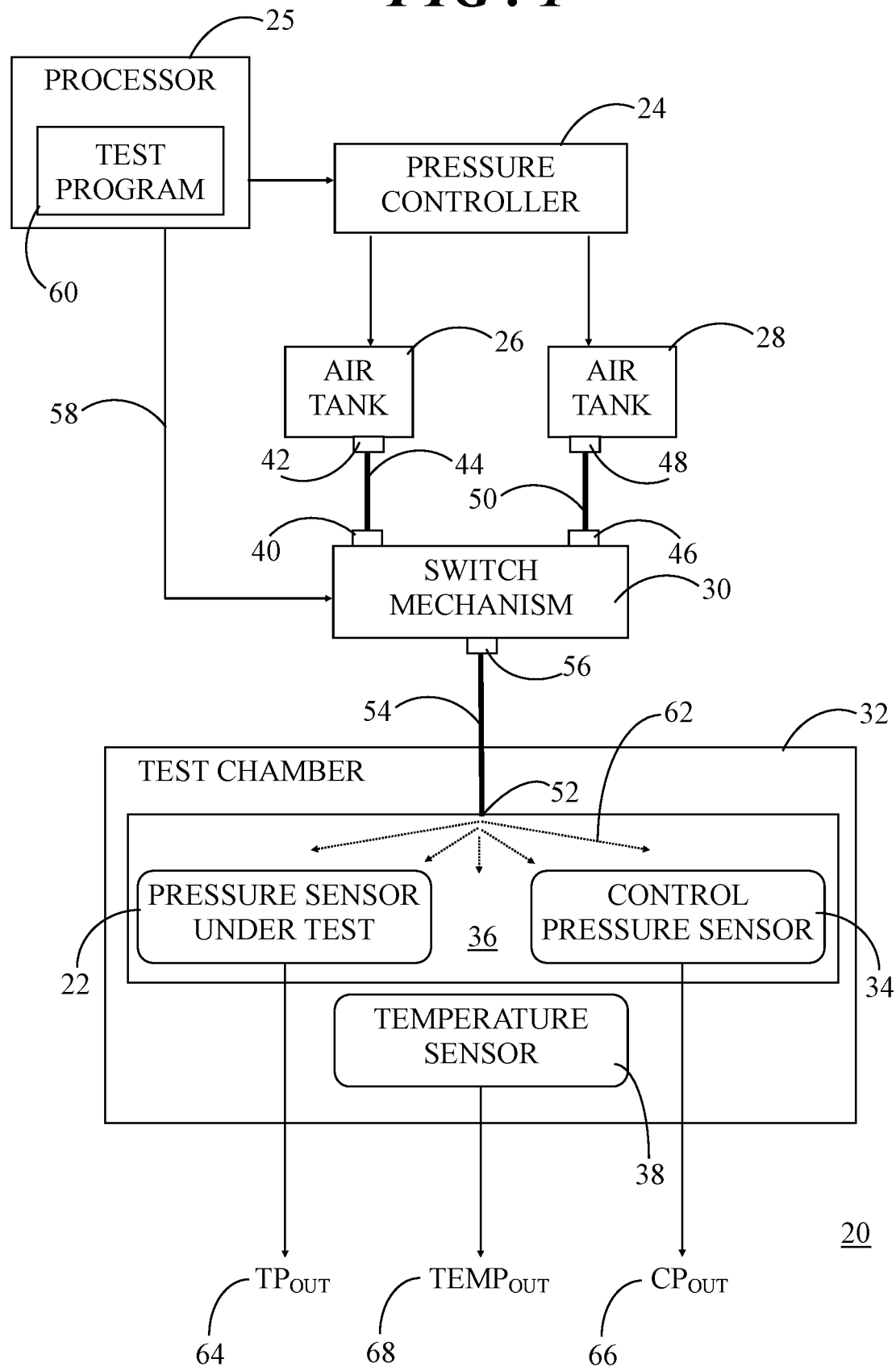
FIG. 1 a block diagram of a system for testing a microelectromechanical system (MEMS) pressure sensor.

Referring to FIG. 1, FIG. 1 shows a block diagram of a system 20 for testing a device under test, e.g., a microelectromechanical system (MEMS) pressure sensor 22. System 20 generally includes a pressure controller 24, a processor 25, a first air tank 26, a second air tank 28, a switch mechanism 30, and a test chamber 32. As will be discussed in significantly greater detail below, test chamber 32 is configured to house pressure sensor 22 and, in some embodiments, a control pressure sensor 34 within a cavity 36 of test chamber 32. Test chamber 32 may further include a temperature sensor 38, as will be discussed below.

Switch mechanism 30 has a first switch input 40 interconnected with an outlet orifice 42 of first air tank 26 via a first hose 44. Switch mechanism 30 also has a second switch input 46 interconnected with an outlet orifice 48 of second air tank 28 via a second hose 50. Test chamber 32 has a port 52 extending into cavity 36 and configured for connection with another hose, referred to herein as a pressure line 54. Pressure line 54, in turn, is interconnected with a switch output 56 of switch mechanism 30. Pressure controller 24 is in communication with each of first and second air tanks 26, 28 for providing clean dry air to each of air tanks 26, 28. Pressure controller 24 can be a dual pressure controller capable of independently regulating the pressure in each of first and second air tanks 26, 28. Thus, air tanks 26, 28 act is an "infinite source" of clean dry air at different regulated pressures.

Processor 25 may be in electrical communication with switch mechanism 30 via, by way of example, a control signal line 58. In addition, processor 25 may be in electrical communication with pressure controller 24 via, for example, an instrument interface cable. Processor 25 is configured to execute a test program 60 for testing pressure sensor 22. Processor 25 may include any suitable combination of hardware and/or software for executing test program 60, commanding pressure controller 24 to pressurized air tanks 26, 28, controlling activation of switch mechanism 30, recording and evaluating pressure sensor output data (e.g., from pressure sensor 22, control pressure sensor 34, temperature sensor 38), and the like.

As will discussed in connection with test methodology below, test program 60 may be suitably executed to control activation of switch mechanism 30 via, by way of example, control signal line 58. Thus, switch mechanism 30 may be activated to enable an air path from first air tank 26 through switch output 56, pressure line 54, and port 52 and into cavity 36. Alternatively, switch mechanism 30 may be activated to enable an air path from second air tank 28 through switch output 56, pressure line 54, and port 52 and into cavity 36.

Those skilled in the art will appreciate that first and second hoses 44, 50 and pressure line 54 are hollow tubes that may be formed of copper, nylon, polyurethane, polyethylene, synthetic or natural rubber, or any other suitable material. Further, a wide variety of connectors, or fasteners, may be implemented to suitably interconnect hoses 44, 50 and pressure line 54 to their respective elements.

In accordance with an embodiment, switch mechanism 30 is a high speed switch that is configured to switch between first and second switch inputs 40, 46 at a speed that is no greater than two milliseconds. The rapid switching capability of switch mechanism 30 combined with structural features of test chamber 32 (discussed below) yields a pressure stimulus, represented by downwardly directed dotted arrows 62, in the form of a step or pulse that is produced and subsequently detected by pressure sensor 22 in less than, for example, ten milliseconds. Although downwardly directed dotted arrows are shown, indicating a positive (i.e., increasing) pressure stimulus 62, the airflow may be bidirectional. By way of example, a vacuum can be applied to one of air tanks 26, 28 and an atmospheric or above atmospheric air pressure can be applied to the other air tank 26, 28.

In response to pressure stimulus 62, MEMS pressure sensor 22 produces a test pressure output signal 64, labeled $TP_{OUT}$. In addition, control pressure sensor 34 produces a control pressure output signal 66, labeled $CP_{OUT}$. Test pressure output signal 64 and control pressure output signal 66 may be recorded, along with a current temperature 68, labeled $TEMP_{OUT}$, of cavity 36 provided by temperature sensor 38. Signals 64, 66 can be evaluated to yield a response time measurement for pressure sensor 22 at a given temperature 68. Accordingly, test system 20 that includes test chamber 32 can be implemented to determine the response time of the device under test, e.g., MEMS pressure sensor 22, to a rapid change in pressure referred to as a pulsed or stepped pressure stimulus 62.

An accurate measurement of the response time of a pressure sensor may be critical in characterizing the response time of a particular pressure sensor for use in an application in which rapid changes in pressure need to be detected. By way of example, one emerging market for pressure sensors that are designed to capture rapid changes in pressure includes side impact airbag automotive applications. A side impact airbag is designed to inflate between the occupant's seat and the door in order to reduce the risk of injury to the pelvic and lower abdomen regions and/or to reduce injury and ejection from the vehicle in rollover crashes. Airbags in a vehicle are controlled by an airbag controller executing an algorithm that monitors a number of related sensors within the vehicle (e.g., accelerometers, impact sensors, pressure sensors, wheel speed sensors, gyroscopes, brake pressure sensors, seat occupancy sensors, and the like).

The signals from the various sensors, including the pressure sensors, are processed by the airbag controller algorithm to determine the angle of impact and the severity or force of the crash, along with other variables. Depending on the result of these calculations, the airbag controller may trigger the ignition of a gas generator propellant to rapidly inflate one or more airbags. An airbag must inflate quickly in order to be fully inflated by the time occupant reaches its outer surface. Accordingly, in a frontal crash the decision to deploy an airbag may be made within 15 to 30 milliseconds after onset of the crash. However, for a side crash or rollover calling for side airbag deployment, some more stringent design requirements are calling for the decision to deploy a side impact airbag within ten milliseconds after onset of the crash. It is projected that an airbag controller may take approximately five microseconds to make a determination as to whether to trigger inflation of a side impact airbag. Therefore, design specifications are calling for pressure sensors in side impact airbag applications to detect and output a pressure signal in less than ten milliseconds, and more particularly, in less than three milliseconds. Accordingly, stringent pressure sensor response time measurement testing calls for the test system to produce and record a pressure signal (in the form of a step or pulsed change in pressure) faster than, for example, three milliseconds.

In system 20, the propagation speed and settle time of pressure stimulus 62 is determined by the activation time of switch mechanism 30 (e.g., less than two milliseconds), the length of first and second hoses 44, 50 and pressure line 54, the volume of cavity 36, the shape of cavity 36, and the change in pressure between the first and second air tanks 26, 28 that is being applied. Accordingly, system 20 can be adapted to measure relative and/or absolute pressure sensor response time in the laboratory during characterization and/or at final test in a production setting.

Figure 2:
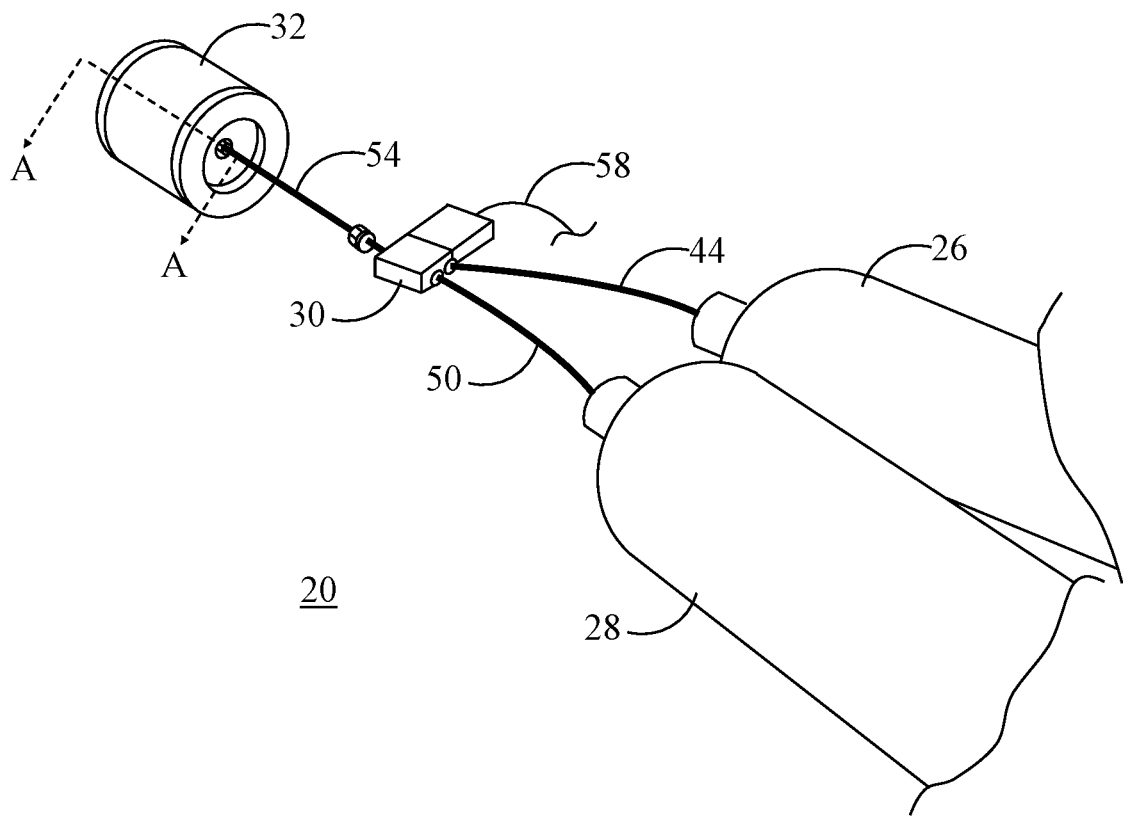
FIG. 2 shows a partial perspective view of the system of FIG. 1 in a test mode.

FIG. 2 shows a partial perspective view of system 20 in a test mode in, for example, a laboratory setting. FIG. 2 shows first and second air tanks 26, 28 interconnected with switch mechanism 30 via the respective air hoses 44, 46. Additionally, FIG. 2 shows test chamber 32 interconnected with switch mechanism 30 via pressure line 54. The partial perspective view of FIG. 2 is provided in particular to illustrate an example of test chamber 32 as being a generally cylindrical configuration. In other embodiments, the exterior surface of test chamber 32 may be a different shape than that which is shown.

Figure 3:
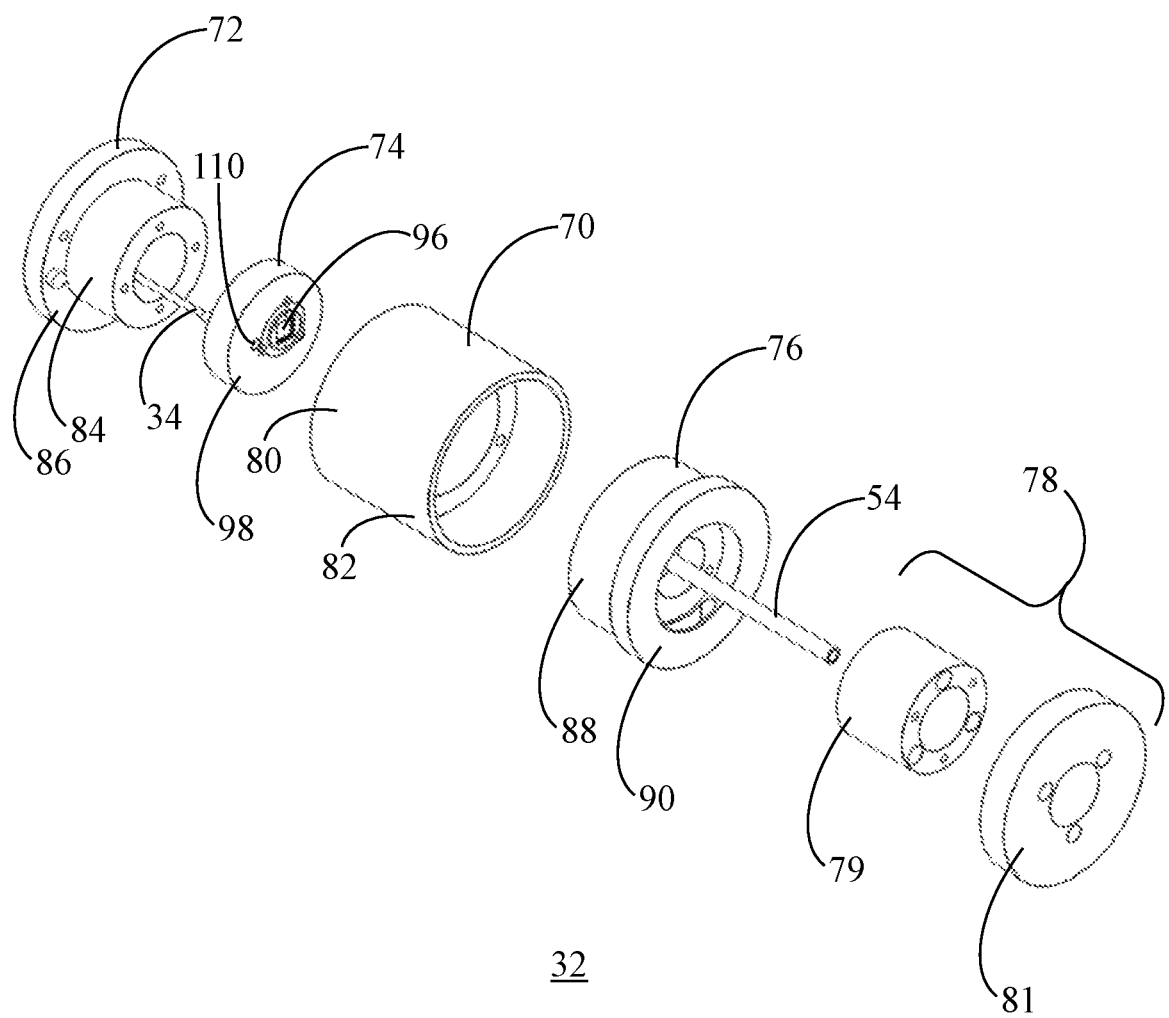
FIG. 3 shows an exploded perspective view of a test chamber of the system of FIG. 1.

Referring now to FIG. 3, FIG. 3 shows an exploded perspective view of test chamber 32 of system 20 (FIG. 1). Test chamber 32 generally includes a housing 70, a base 72, a mounting fixture 74, and a cap member 76. In some embodiments, test chamber 32 further includes mounting hardware 78, in the form of a tubular portion 79 and a fastener 81, which will be discussed in connection with FIG. 7. Housing 70 has a first end 80 and a second end 82. Base 72 includes a pedestal member 84 and an external flange 86 encircling pedestal member 84. Pedestal member 84 is sized to reside within housing 70 with external flange 86 abutting first end 80 of housing 70. Cap member 76 has a body 88 and an external flange 90 encircling body 88. Body 88 is also sized to reside within housing 70 with external flange 90 abutting second end 82 of housing 70.

A portion of pressure line 54 is shown extending from cap 76. As mentioned previously, pressure line 54 is configured to connect with port 52 (FIG. 1), which is not visible in FIG. 3. It should be understood that pressure line 54 can be formed from one or more hollow tubes. For example, a single pressure line 54 may be connected between port 52 and switch output 56 (FIG. 1) of switch mechanism 30 (FIG. 1). Alternatively, the portion of pressure line 54 shown in FIG. 3 may be a separate tube from the portion of pressure line 54 shown in FIG. 2. These separate tubes may be interconnected with fasteners to form a sealed air path between switch output 56 and port 52.

Figure 4:
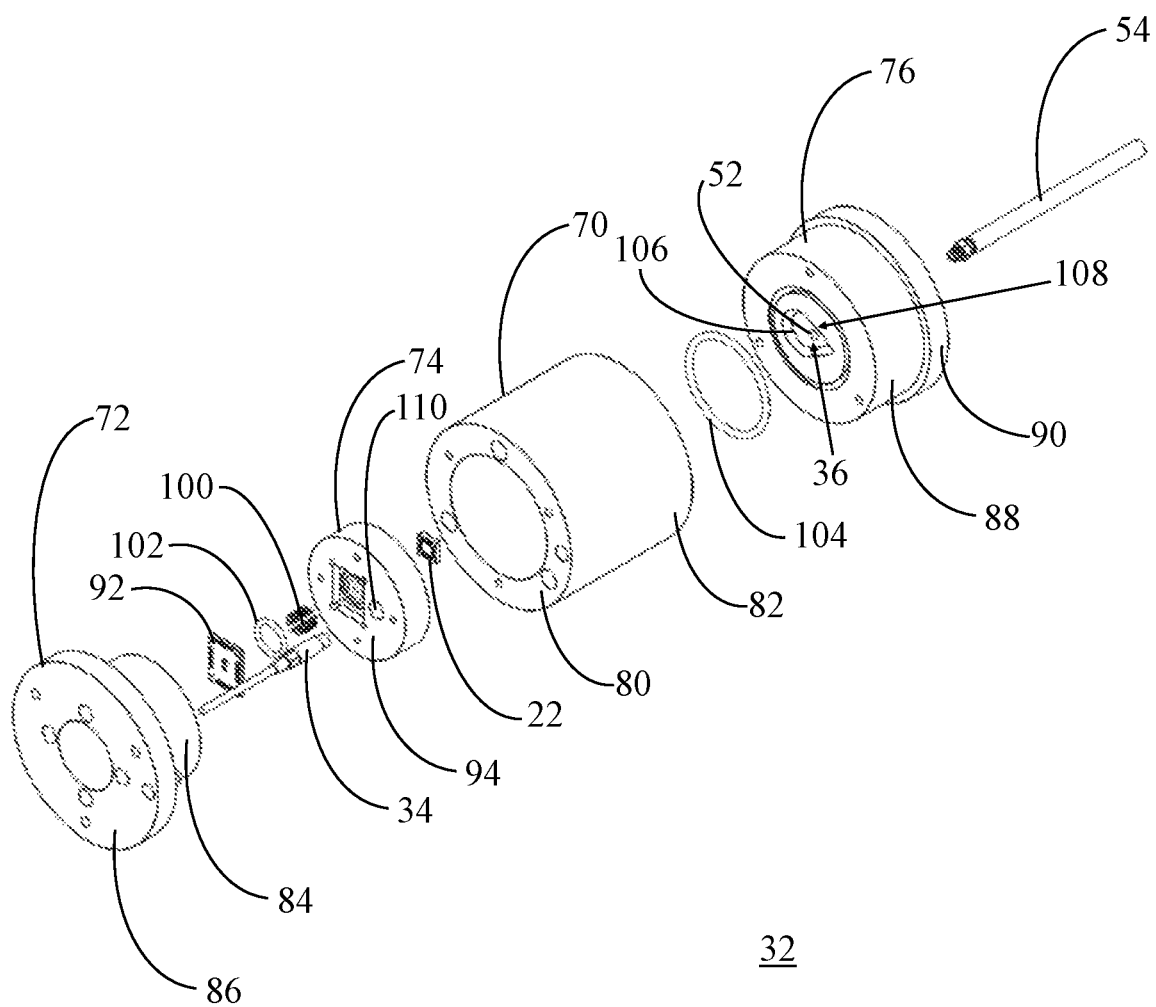
FIG. 4 shows another exploded perspective view of the test chamber.

Referring now to FIGS. 3 and 4, FIG. 4 shows another exploded perspective view of test chamber 32 including housing 70, base 72, mounting fixture 74, cap member 76, and pressure line 54. When test chamber 32 is assembled, mounting fixture 74 is interposed between pedestal member 84 of base 72 and body 88 of cap member 76. Mounting fixture 74 is used to retain MEMS pressure sensor 22, control pressure sensor 34, and temperature sensor 38 (FIG. 1) within test chamber 32.

Additional features of test chamber 32 utilized to retain MEMS pressure sensor 22 include an input/output (I/O) structure 92 configured to be secured within mounting fixture 74 proximate a first external surface 94 of mounting fixture 74, a connection structure 96 (best seen in FIG. 3) secured within mounting fixture 74 proximate a second external surface 98 of mounting fixture 74, and electrically conductive pin elements 100 extending through mounting fixture 74 and configured to interconnect I/O structure 92 and connection structure 96 for providing power to and data from pressure sensor 22, control pressure sensor 34, and/or temperature sensor 38. O-rings 102, 104 may be utilized to provide suitable sealing between the various components when test chamber 32 is assembled.

Body 88 of cap element 76 has a domed inner surface 106 that defines cavity 36. The term "domed" is utilized to describe a configuration in which inner surface 106 of body 88 is concave to yield a somewhat curved or dome-shaped inner surface 106. Port 52 is approximately centered at an apex 108 of domed inner surface 106. In general, connection structure 96 is configured to retain MEMS pressure sensor 22 within cavity 36. Additionally, an orifice 110 extends through mounting fixture 74 between first and second external surfaces 94, 98. Control pressure sensor 34 is inserted through orifice 110 so that a sense element of control pressure sensor 34 also resides within cavity 36. Thus, in the perspective view of FIG. 4, cavity 36 also has an elongated pear or tear-like shape so that both MEMS pressure sensor 22 and control pressure sensor 34 can both reside within cavity 36 while keeping the volume of cavity 36 as small as possible. Various other openings extend through housing 70, base 72, mounting fixture 74, and cap member 76 that are utilizing as screw or fastener receptacles during the assembly of test chamber 32.

Figure 5:
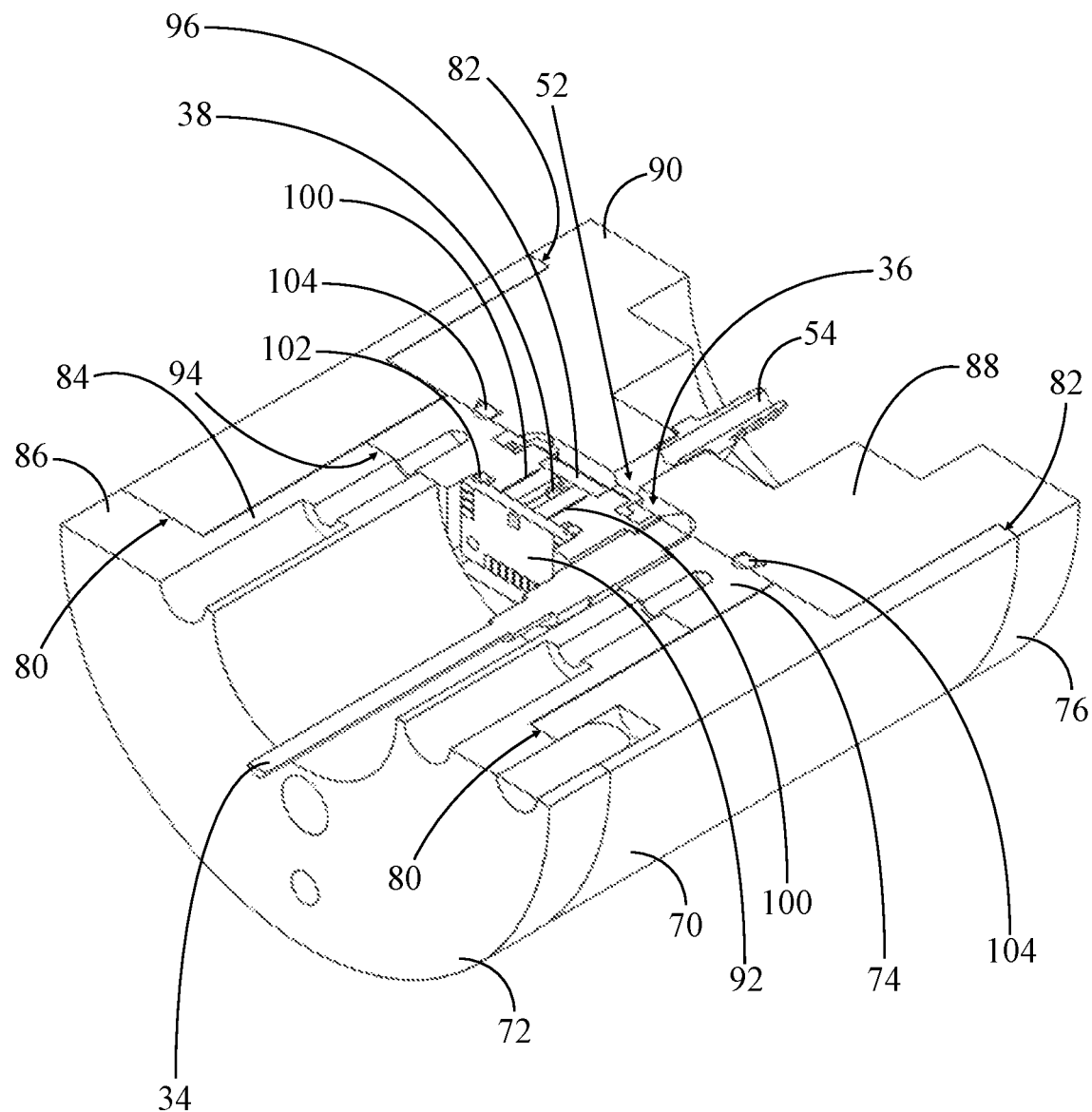
FIG. 5 shows a perspective view of the test chamber along section lines A-A of FIG. 2.
Figure 6:
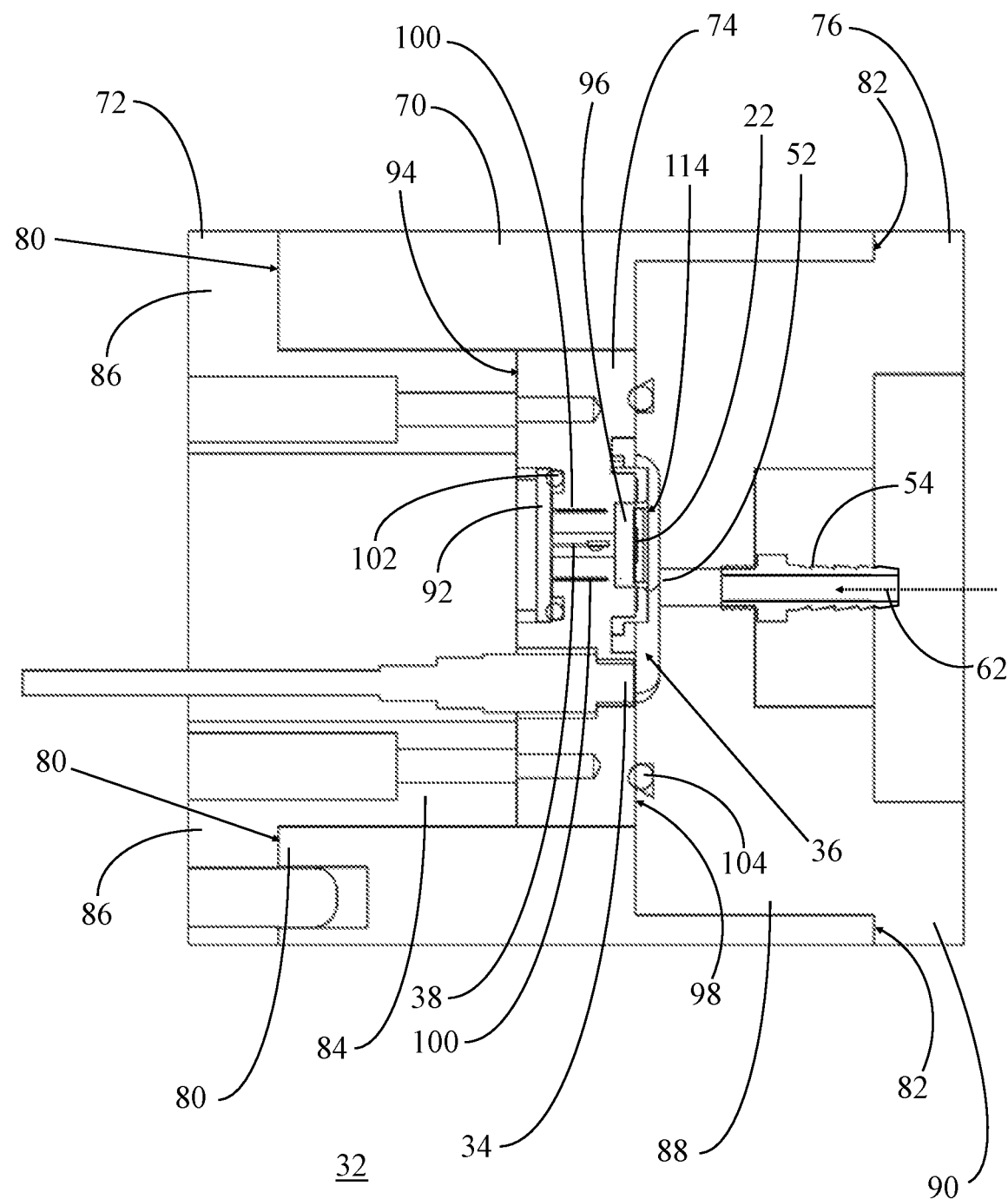
FIG. 6 shows a side view of the test chamber along section lines A-A of FIG. 2.

Referring to FIGS. 5 and 6, FIG. 5 shows a perspective view of test chamber 32 along section lines A-A of FIG. 2, and FIG. 6 shows a side view of test chamber 32 along section lines A-A of FIG. 2. Both of FIGS. 5 and 6 show test chamber in an assembled form. Thus, pedestal member 84 of base 72 resides in housing 70 with external flange 86 abutting first end 80 of housing 70. Likewise, body 88 of cap member 76 resides in housing 70 with external flange 90 abutting second end 82 of housing 70. Further, mounting fixture 74 is interposed between pedestal member 84 of base 72 and body 88 of cap member 76. More particularly, first external surface 94 of mounting fixture 74 is in contact with and coupled to pedestal member 84 of base 72 and second external surface 98 of mounting fixture 74 is in contact with and coupled to body 88 of cap member 76. I/O structure 92 is secured within mounting fixture 74 proximate first external surface 94 and connection structure 96 is secured within mounting fixture 74 proximate second external surface 98.

Temperature sensor 38 is interposed between I/O structure 92 and connection structure 96. Thus, temperature sensor 38 outputs current temperature 68 (FIG. 1), which is indicative of an air temperature currently being experienced by MEMS pressure sensor 22. Additionally, electrically conductive pins 100 are interposed between I/O structure 92 and connection structure 96. Electrically conductive pins 100 extend through mounting fixture 74 to interconnect I/O structure 92 with connection structure 96 and thereby provide power to and data from MEMS pressure sensor 22.

In an embodiment, connection structure 96 may be a printed circuit board having a front side socket in which MEMS pressure sensor 22 may be retained. The printed circuit board may have electrically conductive traces extending through it that are suitably connected with electrically conductive pads on the back side of the printed circuit board connection structure 96. I/O structure 92 may also be a printed circuit board or any other material that electrically routes signals from its front side to its back side.

In some configurations, electrically conductive pins 100 may be pogo pins that establish a connection between I/O structure 92 and connection structure 96. A pogo pin typically takes the form of a slender cylinder containing two sharp, spring-loaded pins. Pressed between two electronic circuit boards, such as corresponding pads on I/O structure 92 and connection structure 96, the sharp points at each end of the pogo pin make secure contacts with the corresponding pads on I/O structure 92 and connection structure 96 and thereby electrically connect them together.

Thus, when test chamber 32 is assembled, conductive pins 100 electrically connect the conductive pads on the back side of connection structure 96 with conductive pads on the front side of I/O structure 92. The electrical routing through I/O structure 92 enables input (e.g., for power input) and/or output (e.g., for data output) on the back side of I/O structure 92. A wire harness (not shown) may be coupled to the back side of I/O structure 92 and extend through and exit out of base 72 to enable the communication of power and data. One example structural configuration for retaining MEMS pressure sensor 22 on pedestal member 84 of base 72 within mounting fixture 74 is described herein. However, those skilled in the art will recognize that mounting fixture 74, I/O structure 92, connection structure 96, and conductive pins 100 can have a great variety of forms and configurations that enable retention of MEMS pressure sensor 22 on pedestal member 84.

As further shown in FIG. 6, control pressure sensor 34 is mounted in mounting fixture 74 within pedestal member 84 of base 72. In some embodiments, control pressure sensor 34 may be a calibrated ballistic pressure sensor having a piezoresistive sense element that is capable of detecting high pressures and having suitable response time characteristics. However, other pressure sensors may be implemented for control pressure sensor 34.

A sense element of control pressure sensor 34 is positioned adjacent to and generally in the same plane with a mounting location 114 of MEMS pressure sensor 22. Further, the device under test, i.e., MEMS pressure sensor 22, and control pressure sensor 34 are located within cavity 36, and cavity 36 is configured to having minimal volume. As such, both of MEMS pressure sensor 22 and control pressure sensor 34 are generally subject to the same pressure stimulus 62.

Again, the propagation speed and settle time of pressure stimulus 62 is determined in part by the activation time of switch mechanism 30 (FIG. 1), the length of hoses 44, 50 (FIG. 1), the length of pressure line 54, and the change in air pressure being applied. The propagation speed and settle time of pressure stimulus 62 is further determined by the volume of cavity 36 and the shape of cavity 36. Connection structure 96 is configured to retain a single pressure sensor 22 to minimize the volume of cavity 36. The length of hoses 44, 50 and the length of pressure line 54 have a minimized length to minimize the delay of pressure stimulus 62. Additionally, the domed inner surface 106 of cavity 36 reduces rebounds, or ringing, of pressure stimulus 62, and port 52 is centered at the apex 108 of cavity 36 so that pressure stimulus 62 travels almost the same distance to both MEMS pressure sensor 22 and control pressure sensor 34. It is this combination of features that yields pressure stimulus 62 as a change in pressure (delta pressure) in the form of a pulse of clean dry air that is produced and subsequently detected at MEMS pressure sensor 22 in less than three milliseconds.

Figure 7:
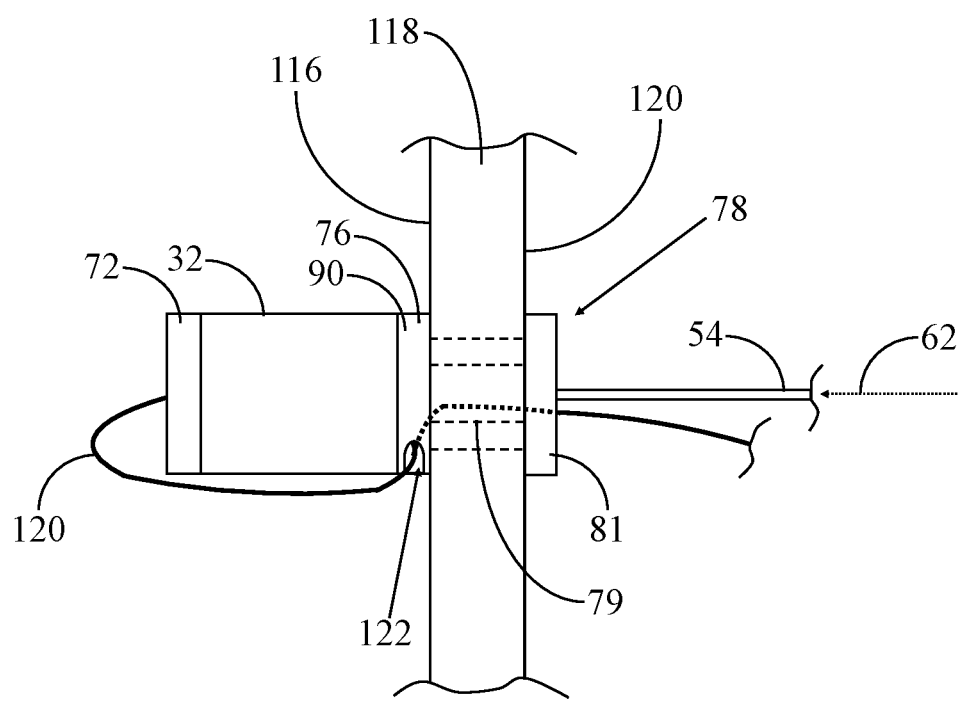
FIG. 7 shows a simplified partial side view of the test chamber mounted in an oven.

Referring to FIGS. 3 and 7, FIG. 7 shows a simplified partial side view of test chamber 32 mounted on an inner wall 116 in an oven 118 using mounting hardware 78. Tubular portion 79 (shown in dashed line format) of mounting hardware 78 is adapted to reside in an opening extending through oven 118 to couple with cap member 76 located at inner wall 116 of oven 118. Fastener 81 of mounting hardware is thus located at an exterior wall 120 of oven 118 and is coupled to tubular portion 79 via, for example, screws. Pressure line 54 extends through mounting hardware 78 so that pressure stimulus 62 can be provided to cavity 36 (FIG. 6) of test chamber 32. In addition, a wire harness 120 exiting from base 72 is routed through a slotted opening 122 in external flange 90 of cap member 76. Wire harness 120 can subsequently be routed through tubular portion 79 of mounting hardware 78 so that power can be provided to MEMS pressure sensor 22 and control pressure sensor 34, and so that data can be received from MEMS pressure sensor 22, control pressure sensor 34, and temperature sensor 38 (FIG. 1) for evaluation.

The configuration of FIG. 7 enables testing and characterization of the response time of MEMS pressure sensor 22 over a range of air pressures and a various temperatures utilizing oven 118. An example test configuration may call for a test setup (e.g., system 20) to produce and record a pressure signal from MEMS pressure sensor 22 faster than 2.5 milliseconds (400 Hz), over an absolute pressure range of 44 kPa to 170 kPa (Kilo Pascal), with a change in pressure, i.e., a delta pressure ($\Delta P$), range of $\pm 6$ kPa$\leq \Delta P \leq \pm 50$ kPa. Further, such testing may be performed at temperature ranges of $-40°$ C. to $125°$ C.

Figure 8:
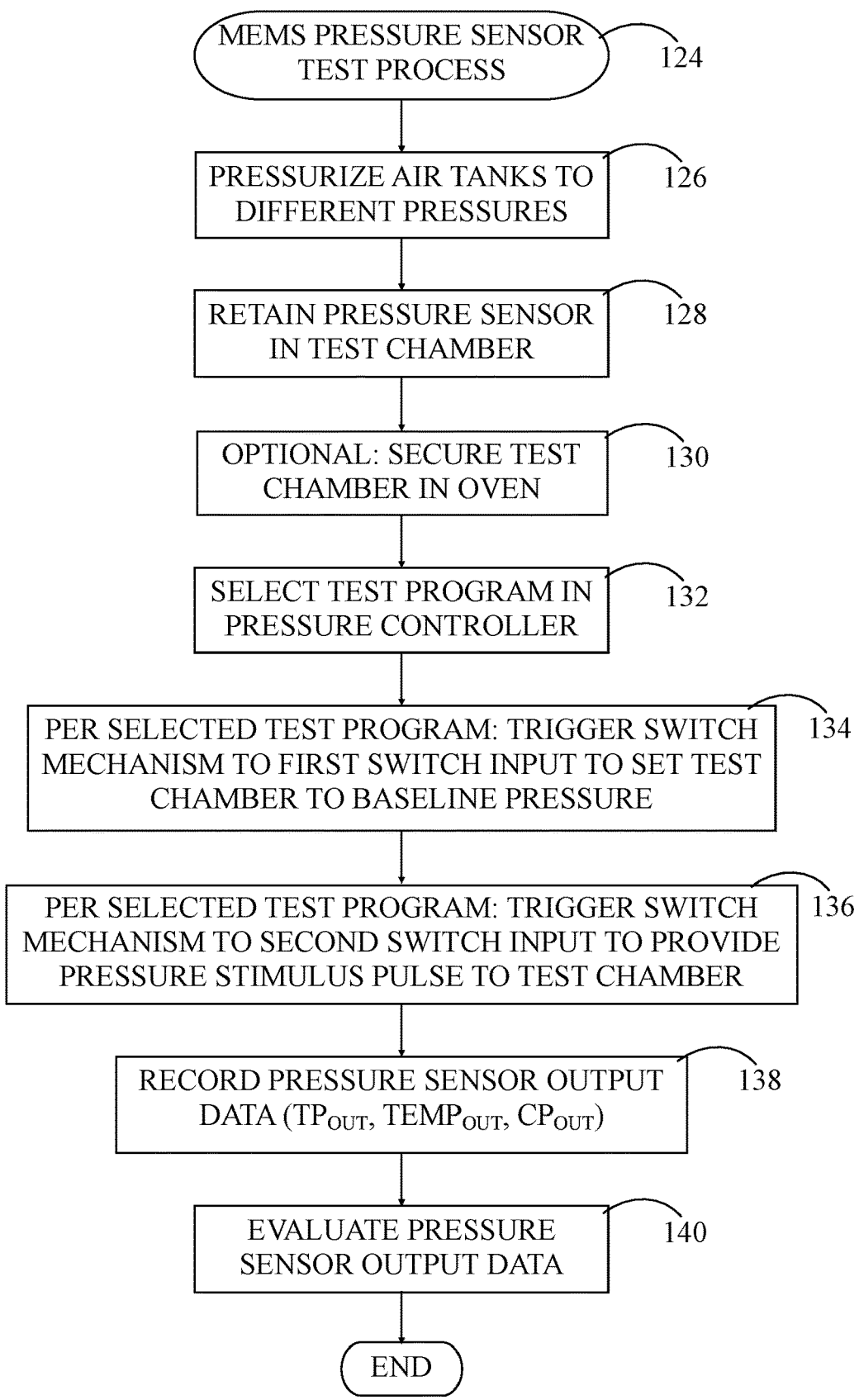
FIG. 8 shows a flowchart of a MEMS pressure sensor test process.

Referring to FIGS. 1 and 8, FIG. 8 shows a flowchart of a MEMS pressure sensor test process 124 that may be performed to measure the response time of a MEMS pressure sensor (e.g., MEMS pressure sensor 22) utilizing system 20 (FIG. 1) given particular test criteria such as that set forth in the previous paragraph. MEMS pressure sensor test process 124 is described in terms of response time measurement. However, it should be understood that execution of test process 124 further determines the functionality of a pressure sensor. Therefore, process 124 may additionally be executed in a laboratory configuration during an evaluation phase or in a production environment during final testing to provide response time measurement as well as functionality testing. Test process 124 is further described in connection with testing a single MEMS pressure sensor. However, system 20 may include multiple test chambers 34 that are concurrently pressurized to enable concurrent testing of multiple pressure sensors in, for example, a production environment during final testing.

At a block 126, first and second air tanks 26, 28 are filled and pressurized to different air pressures. In one example, first air tank 26 may be pressurized to a baseline air pressure and second air tank 28 may be pressurized to a second, higher, air pressure that will be used to generate the pressure stimulus pulse 62. At a block 128, MEMS pressure sensor 22 is retained in test chamber 32. At an optional block 130, test chamber 32 may be secured to oven 118 as described in connection with FIG. 7.

At a block 132, a particular test program 60 may be selected from a library of test protocols stored in connection with processor 25. At a block 134, switch mechanism 30 may be triggered to first switch input 40 (as needed) to set cavity 36 of test chamber 32 to a baseline pressure per the selected test program 60. If an iteration of process 124 is being performed within oven 118, oven 118 may also be set to a particular test temperature.

MEMS pressure sensor text process 124 continues with a block 136 after a period of time in which the baseline pressure detected at MEMS pressure sensor 22 has settled and the oven (if used) is at the particular test temperature. At block 136, switch mechanism 30 is triggered to second switch input 46 to provide pressure stimulus 62 in the form of a pulse to cavity 36 of test chamber 32. At a block 138, pressure sensor output data (e.g., output signal 66, control output signal 68, and current temperature 70) is recorded at, for example, pressure controller 24 or at a separate analysis processor. At a block 140, the recorded pressure sensor output data is evaluated to characterize the response time of pressure sensor 22 and/or to determine the functionality of pressure sensor 22. Thereafter, a single iteration of test process 124 ends. Of course, test process 124 may be repeated multiple times on a single MEMS pressure sensor at different delta pressures, different oven temperatures, and so forth in accordance with a particular test protocol.

Figure 9:
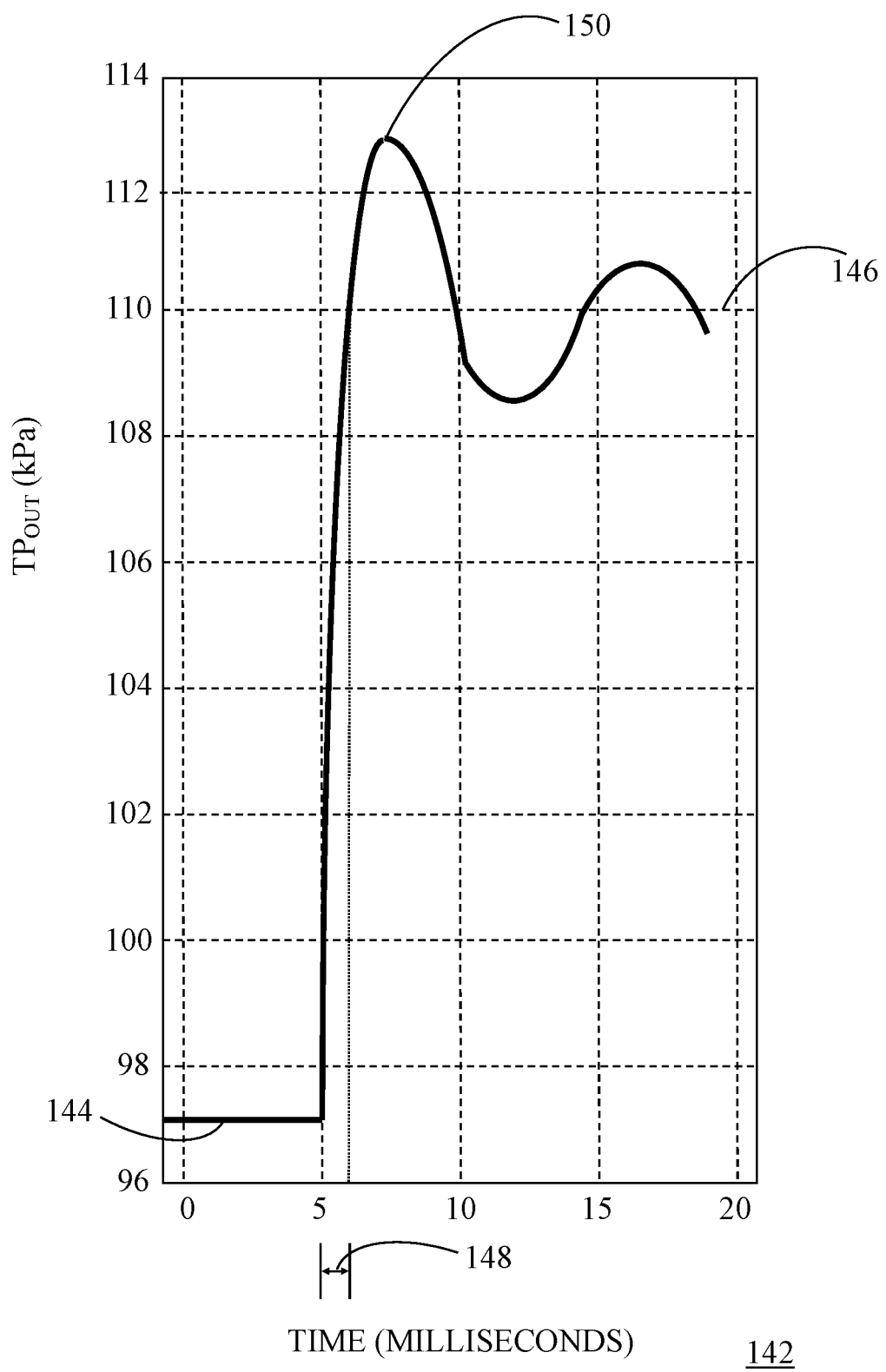
FIG. 9 shows a chart representing an example test result produced by utilizing the system of FIG. 1 and executing the MEMS pressure sensor test process of FIG. 8.

Referring now to FIG. 9, FIG. 9 shows a chart 142 representing an example test result produced by utilizing system 20 (FIG. 1) and executing MEMS pressure sensor test process (FIG. 8). In this example, a baseline pressure 144 is set to 97 kPa (i.e., the air pressure of first air tank 26) and a final pressure 146 is set to 110 kPa (i.e., the air pressure of second air tank 28). Switch mechanism 30 is triggered to disable airflow from first air tank 26 and to enable airflow from second air tank 28. This switching action and the resulting change in pressure results in a pulse or stepped response detected at MEMS pressure sensor 22. A response time 148 is the time it takes to reach a final pressure 146 which can be prior to reaching a peak pressure 150. That is, peak pressure 150 is simply an overshoot or artifact from the burst of pressure stimulus 62 prior to settling to final pressure 146. Accordingly, the difference between baseline pressure 144 and final pressure 146 represents a delta or change in air pressure ($\Delta P$) in accordance with a particular test protocol. In this example, response time 148 is approximately 1.25 milliseconds. A greater pressure difference between the baseline pressure and the final pressure may be achieved while still falling with, for example, a five millisecond window.

Thus, a system, a test chamber used within the system, and a method of testing MEMS pressure sensors using the system and test chamber are disclosed herein. An embodiment of a test chamber for housing a MEMS pressure sensor during testing of the MEMS pressure sensor comprises a housing having a first end and a second end, a base having a pedestal member and a first external flange encircling the pedestal member, the pedestal member residing within the housing with the first external flange abutting the first end of the housing, the pedestal member being configured to retain the MEMS pressure sensor. The test chamber further comprises a cap member having a body and a second external flange encircling the body, the body residing within the housing with the second external flange abutting the second end of the housing, and the body having a domed inner surface that defines a cavity configured to house the MEMS pressure sensor when the MEMS pressure sensor is retained on the pedestal.

An embodiment of a system for testing a MEMS pressure sensor comprises a pressure controller, a first pressure tank, a second pressure tank, a switch mechanism, and a test chamber. The switch mechanism has a first switch input, a second switch input, and a switch output, the first switch input being interconnected with the first pressure tank via a first hose, the second switch input being interconnected with the second pressure tank via a second hose, wherein the pressure controller directs activation of the switch mechanism between the first and second switch inputs to provide a pressure stimulus from one of the first and second pressure tanks. The test chamber includes a housing having a first end and a second end, a base having a pedestal member and a first external flange encircling the pedestal member, the pedestal member residing within the housing with the first external flange abutting the first end of the housing, the pedestal member being configured to retain the MEMS pressure sensor, and a cap member having a body and a second external flange encircling the body, the body residing within the housing with the second external flange abutting the second end of the housing, the body having a domed inner surface that defines a cavity configured to house the MEMS pressure sensor when the MEMS pressure sensor is retained on the pedestal, and the body having a port extending through the body and into the cavity, the port being interconnected with the switch output via a pressure line for provision of the pressure stimulus into the cavity.

An embodiment of a method of testing a MEMS pressure sensor comprises retaining the MEMS pressure sensor in a test chamber, the test chamber including a housing having a first end and a second end, a base having a pedestal member and a first external flange encircling the pedestal member, the pedestal member residing within the housing with the first external flange abutting the first end of the housing, and a cap member having a body and a second external flange encircling the body, the body residing within the housing with the second external flange abutting the second end of the housing, and the body having a domed inner surface that defines a cavity, the retaining operation comprising retaining the MEMS pressure sensor on the pedestal member within the cavity. The method further comprises setting the cavity of the test chamber to a baseline pressure, triggering a switch mechanism to provide a pressure stimulus pulse to the cavity of the test chamber, recording an output signal from the MEMS pressure sensor, and evaluating the output signal to characterize a response time of the MEMS pressure sensor.

The embodiments described herein enable response time measurement for pressure sensors that are designed to capture rapid changes in pressure, such as in side airbag automotive applications. Further, the system and method may be implemented in a laboratory configuration in the evaluation phase of pressure sensor development and/or in a production environment during final testing.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A test chamber for housing a microelectromechanical systems (MEMS) pressure sensor during testing of said MEMS pressure sensor comprising:
   a housing having a first end and a second end;
   a base having a pedestal member and a first external flange encircling said pedestal member, said pedestal member residing within said housing with said first external flange abutting said first end of said housing, said pedestal member being configured to retain said MEMS pressure sensor; and
   a cap member having a body and a second external flange encircling said body, said body residing within said housing with said second external flange abutting said second end of said housing, and said body having a domed inner surface extending inwardly into said body to define a cavity, at least a portion of said domed inner surface having a curved shape, the cavity being configured to house said MEMS pressure sensor when said MEMS pressure sensor is retained on said pedestal, wherein said cap member comprises a port extending through said body and into said cavity, said port being configured for attachment with a pressure line for provision of a pressure stimulus into said cavity, and wherein said pressure stimulus comprises air.

2. The test chamber of claim 1 further comprising:
   a mounting fixture interposed between said pedestal member of said base and said body of said cap;
   an input/output (I/O) structure secured within said mounting fixture proximate a first external surface of said mounting fixture, said first external surface being in contact with and coupled to said pedestal member;
   a connection structure secured within said mounting fixture proximate a second external surface of said mounting fixture, said second external surface being in contact with and coupled to said body of said cap member, said connection structure being configured to retain said MEMS pressure sensor within said cavity; and
   electrically conductive pin elements extending through said mounting fixture and interconnecting said I/O structure and said connection structure for providing power to and sensor data from said MEMS pressure sensor.

3. The test chamber of claim 1 further comprising a control pressure sensor mounted within said pedestal member of said base and positioned adjacent to and in the same plane with a mounting location for said MEMS pressure sensor.

4. The test chamber of claim 3 wherein said cavity is sized to house both of said MEMS pressure sensor and said control pressure sensor.

5. The test chamber of claim 1 further comprising a control temperature sensor mounted within said pedestal member of said base and underlying a mounting location for said MEMS pressure sensor.

6. The test chamber of claim 1 wherein said port is centered at an apex of said domed inner surface.

7. A system for testing a microelectromechanical systems (MEMS) pressure sensor comprising:
   a processor;
   a first tank;
   a second tank, said first and second tanks being pressurized to different air pressures;

a switch mechanism having a first switch input, a second switch input, and a switch output, said first switch input being interconnected with said first tank via a first hose, said second switch input being interconnected with said second tank via a second hose, wherein said processor directs activation of said switch mechanism between said first and second switch inputs to provide a pressure stimulus from one of said first and second tanks; and a test chamber comprising:
- a housing having a first end and a second end;
- a base having a pedestal member and a first external flange encircling said pedestal member, said pedestal member residing within said housing with said first external flange abutting said first end of said housing, said pedestal member being configured to retain said MEMS pressure sensor; and
- a cap member having a body and a second external flange encircling said body, said body residing within said housing with said second external flange abutting said second end of said housing, said body having a domed inner surface extending inwardly into said body to define a cavity, at least a portion of said domed inner surface having a curved shape, the cavity being configured to house said MEMS pressure sensor when said MEMS pressure sensor is retained on said pedestal, and said body having a port extending through said body and into said cavity, said port being interconnected with said switch output via a pressure line for provision of said pressure stimulus into said cavity, wherein said pressure stimulus comprises air.

8. The system of claim 7 wherein said switch mechanism is configured to switch between said first and second switch inputs at a speed that is no greater than two milliseconds.

9. The system of claim 8 wherein said speed of said switch mechanism combined with a volume of said cavity yields said pressure stimulus in the form of a pulse capable of being produced and subsequently detected by said MEMS pressure sensor in less than ten milliseconds.

10. The system of claim 7 wherein said test chamber further comprises:
- a mounting fixture interposed between said pedestal member of said base and said body of said cap;
- an input/output (I/O) structure secured within said mounting fixture proximate a first external surface of said mounting fixture, said first external surface being in contact with and coupled to said pedestal member;
- a connection structure secured within said mounting fixture proximate a second external surface of said mounting fixture, said second external surface being in contact with and coupled to said body of said cap member, said connection structure being configured to retain said MEMS pressure sensor within said cavity; and
- electrically conductive pin elements extending through said mounting fixture and interconnecting said I/O structure and said connection structure for providing power to and sensor data from said MEMS pressure sensor.

11. The system of claim 7 wherein said test chamber further comprises a control pressure sensor mounted within said pedestal member of said base adjacent to and in the same plane with a mounting location for said MEMS pressure sensor.

12. The system of claim 11 wherein said port is centered at an apex of said domed inner surface of said cap over said MEMS pressure sensor and said control pressure sensor.

13. The system of claim 11 wherein said cavity of said test chamber is sized to house both of said MEMS pressure sensor and said control pressure sensor.

14. The system of claim 7 wherein said test chamber further comprises a control temperature sensor mounted within said pedestal member of said base and underlying a mounting location for said MEMS pressure sensor.

15. A method of testing a microelectromechanical systems (MEMS) pressure sensor comprising:
- retaining said MEMS pressure sensor in a test chamber, said test chamber including a housing having a first end and a second end, a base having a pedestal member and a first external flange encircling said pedestal member, said pedestal member residing within said housing with said first external flange abutting said first end of said housing, and a cap member having a body and a second external flange encircling said body, said body residing within said housing with said second external flange abutting said second end of said housing, and said body having a domed inner surface extending inwardly into said body to define a cavity, at least a portion of said domed inner surface having a curved shape, wherein said cap member comprises a port extending through said body and into said cavity, said port being configured for attachment with a pressure line, said retaining operation comprising retaining said MEMS pressure sensor on said pedestal member within said cavity;
- setting said cavity of said test chamber to a baseline pressure;
- triggering a switch mechanism to provide a pressure stimulus pulse into said cavity of said test chamber via said port, wherein said pressure stimulus pulse comprises air;
- recording an output signal from said MEMS pressure sensor; and
- evaluating said output signal to characterize a response time of said MEMS pressure sensor.

16. The method of claim 15 wherein said triggering and recording operations occur in less than 2.5 milliseconds.

17. The method of claim 15 wherein said setting, triggering, and recording operations are performed with said cavity of said test chamber at a first temperature and said method further comprises repeating said setting, triggering, and recording operations at a second temperature that differs from said first temperature.

* * * * *